(12) United States Patent
Mushkin et al.

(10) Patent No.: US 9,455,764 B2
(45) Date of Patent: Sep. 27, 2016

(54) WIRELESS COMMUNICATION SYSTEM

(71) Applicant: Tyco Fire & Security GmbH, Neuhausen am Rheinfall (CH)

(72) Inventors: Mordechai Mushkin, Nirit (IL); Shimon Zigdon, Netanya (IL); Miri Ratner, Ramat Gan (IL); David Harif, Ramat Gan (IL)

(73) Assignee: Tyco Fire & Security GmbH, Neuhausen en Rheinfall (CH)

( * ) Notice: Subject to any disclaimer, the term of this patent is extended or adjusted under 35 U.S.C. 154(b) by 0 days.

(21) Appl. No.: 14/529,459

(22) Filed: Oct. 31, 2014

(65) Prior Publication Data

US 2015/0043552 A1    Feb. 12, 2015

Related U.S. Application Data

(62) Division of application No. 12/597,945, filed as application No. PCT/IL2008/000581 on Apr. 30, 2008, now Pat. No. 8,902,933.

(60) Provisional application No. 60/927,506, filed on May 2, 2007.

(51) Int. Cl.
| | | |
|---|---|---|
| *H04B 1/7163* | (2011.01) | |
| *H04B 1/7183* | (2011.01) | |
| *H04B 1/7136* | (2011.01) | |
| *H04B 1/713* | (2011.01) | |
| *H04W 72/08* | (2009.01) | |

(Continued)

(52) U.S. Cl.
CPC ............ *H04B 1/7136* (2013.01); *H04B 1/713* (2013.01); *H04L 5/14* (2013.01); *H04W 56/001* (2013.01); *H04W 72/085* (2013.01); *H04B 1/7183* (2013.01); *H04B 1/71635* (2013.01)

(58) Field of Classification Search
None
See application file for complete search history.

(56) References Cited

U.S. PATENT DOCUMENTS

| | | |
|---|---|---|
| 5,408,506 A | 4/1995 | Mincher et al. |
| 5,428,645 A | 6/1995 | Dolev et al. |
| 5,550,873 A | 8/1996 | Dolev et al. |

(Continued)

FOREIGN PATENT DOCUMENTS

| | | |
|---|---|---|
| EP | 0651362 A1 | 5/1995 |
| WO | 95/02294 A1 | 1/1995 |

(Continued)

OTHER PUBLICATIONS

"Technical Overview of Time Synchronized Mesh Protocol (TSMP)", by Dust Networks, 30695 Huntwood Avenue, Hayward, CA 94544 USA (document No. 025-0003-01, Jun. 20, 2006).

(Continued)

*Primary Examiner* — Brandon Renner
*Assistant Examiner* — Prince A Mensah
(74) *Attorney, Agent, or Firm* — HoustonHogle LLP

(57) ABSTRACT

A method for communication includes transmitting a first uplink message from a first remote node (200, 300, 400) to a central node (100) in a wireless communication system according to a first frequency hopping scheme, and transmitting a second uplink message from a second remote node to the central node in the wireless communication system according to a second frequency hopping scheme, different from the first scheme. Both the first and the second uplink messages are received and processed at the central node.

14 Claims, 11 Drawing Sheets

(51) Int. Cl.
  *H04W 56/00* (2009.01)
  *H04L 5/14* (2006.01)

(56) References Cited

U.S. PATENT DOCUMENTS

| | | | |
|---|---|---|---|
| 5,719,859 | A | 2/1998 | Kobayashi et al. |
| 5,822,383 | A | 10/1998 | Muntz et al. |
| 5,875,184 | A | 2/1999 | Altvater et al. |
| 6,138,019 | A | 10/2000 | Trompower et al. |
| 6,148,049 | A | 11/2000 | Hein |
| 6,240,073 | B1 | 5/2001 | Reichman et al. |
| 6,449,291 | B1 | 9/2002 | Burns et al. |
| 6,477,181 | B1 | 11/2002 | Fujimori et al. |
| 6,587,498 | B1 | 7/2003 | Sarkola |
| 6,980,800 | B2 | 12/2005 | Noerpel et al. |
| 7,035,310 | B1 | 4/2006 | Roberts |
| 7,058,089 | B2 | 6/2006 | Franchuk et al. |
| 7,079,831 | B2 | 7/2006 | Schwartzman et al. |
| 7,151,945 | B2 | 12/2006 | Myles et al. |
| 7,161,923 | B2 | 1/2007 | Young |
| 7,180,915 | B2 | 2/2007 | Beyer et al. |
| 7,623,836 | B1 * | 11/2009 | Finkelstein ......... H04L 27/2647 455/133 |
| 2002/0075941 | A1 | 6/2002 | Souissi et al. |
| 2002/0131484 | A1 | 9/2002 | Diepstraten et al. |
| 2002/0155838 | A1 | 10/2002 | Durrant et al. |
| 2003/0117991 | A1 | 6/2003 | Beyer et al. |
| 2003/0151513 | A1 | 8/2003 | Herrmann et al. |
| 2004/0053582 | A1 * | 3/2004 | Nakanishi ............. H01Q 1/242 455/101 |
| 2004/0087343 | A1 | 5/2004 | Lucidarme et al. |
| 2005/0018634 | A1 * | 1/2005 | Mantha ................ H04B 7/0814 370/334 |
| 2005/0078737 | A1 | 4/2005 | Craig et al. |
| 2005/0085197 | A1 * | 4/2005 | Laroia ..................... H01Q 3/24 455/101 |
| 2005/0207451 | A1 | 9/2005 | Partyka |
| 2005/0213612 | A1 | 9/2005 | Pister et al. |
| 2005/0281242 | A1 | 12/2005 | Sutivong et al. |
| 2006/0029060 | A1 | 2/2006 | Pister |
| 2006/0029061 | A1 | 2/2006 | Pister et al. |
| 2006/0034239 | A1 | 2/2006 | Abeta et al. |
| 2006/0040611 | A1 * | 2/2006 | Ding ................. H04B 7/15585 455/11.1 |
| 2006/0140251 | A1 | 6/2006 | Brown et al. |
| 2006/0262874 | A1 * | 11/2006 | Shan ....................... H01Q 3/26 375/267 |
| 2006/0285579 | A1 | 12/2006 | Rhee et al. |
| 2007/0047478 | A1 | 3/2007 | Balachandran et al. |
| 2007/0064730 | A1 | 3/2007 | Jin et al. |
| 2007/0073805 | A1 | 3/2007 | Jorgensen |
| 2007/0093252 | A1 | 4/2007 | Rahman et al. |
| 2007/0104228 | A1 | 5/2007 | Cohen et al. |
| 2007/0206510 | A1 | 9/2007 | Morris et al. |
| 2008/0075128 | A1 | 3/2008 | Fourcand |
| 2008/0108310 | A1 * | 5/2008 | Tong .................... H04B 7/0617 455/69 |
| 2008/0139153 | A1 * | 6/2008 | Tuo ...................... H04B 17/391 455/277.2 |
| 2008/0232325 | A1 * | 9/2008 | Mehta .................... H04B 7/061 370/332 |

FOREIGN PATENT DOCUMENTS

| | | |
|---|---|---|
| WO | 96/10306 A1 | 4/1996 |
| WO | 00/69102 A1 | 11/2000 |
| WO | 01/84735 A1 | 11/2001 |
| WO | 02/058276 A1 | 7/2002 |
| WO | 2006/013310 A1 | 2/2006 |
| WO | 2006/130662 A2 | 12/2006 |
| WO | 2008/135975 A2 | 11/2008 |

OTHER PUBLICATIONS

International Search Report and Written Opinion, dated Sep. 29, 2010, for PCT/IL08/00581.
European Patent Office, Extended European Search Report, dated Jun. 11, 2014, for European Patent Application No. 08738283.4.
International Preliminary Report on Patentability, dated Oct. 26, 2010, for PCT/IL2008/000581.

* cited by examiner

WIRELESS COMMUNICATION SYSTEM

CROSS REFERENCE TO RELATED APPLICATIONS

This application is a Division of U.S. application Ser. No. 12/597,945, filed on Apr. 30, 2008, which is a National Stage Application of PCT/IL2008/000581, filed on Apr. 30, 2008, which claims priority to U.S. Provisional Application 60/927,506, filed May 2, 2007, all of which are incorporated herein by reference in their entirety.

This application is related to U.S. application Ser. No. 14/529,442, filed on an even date herewith, now U.S. Patent Publication No.: 2015/0055684 A1; U.S. application Ser. No. 14/529,446 filed on an even date herewith, now U.S. Patent Publication No.: 2015/0043569 A1; and U.S. application Ser. No. 14/529,455, filed on an even date herewith, now U.S. Patent Publication No.: 2015/0043618A1.

FIELD AND BACKGROUND OF THE INVENTION

The present invention relates to wireless communication systems. Some wireless communication systems, such as event reporting systems, use synchronized, time-slotted, frequency-hopping schemes and switched antenna diversity mechanisms

SUMMARY OF THE INVENTION

There is provided, in accordance with an embodiment of the present invention, a method for communication, including:

transmitting a first uplink message from a first remote node to a central node in a wireless communication system according to a first frequency hopping scheme;

transmitting a second uplink message from a second remote node to the central node in the wireless communication system according to a second frequency hopping scheme, different from the first scheme; and receiving and processing both the first and the second uplink messages at the central node.

In a disclosed embodiment, the second frequency hopping scheme is a non-synchronized frequency hopping scheme, and receiving the second uplink message includes scanning a receiver of the central node over the frequencies used in the second frequency hopping scheme in order to detect the second uplink message. The second frequency hopping scheme may be used by remote nodes in the wireless communication system that are not synchronized with the central node.

In some embodiments, the first frequency hopping scheme is a synchronized, time-slotted, frequency hopping scheme. The method may include synchronizing the first remote node with the central node prior to transmission of the first uplink message. A second remote node may transmit the second uplink message using the second frequency hopping scheme in order to join the wireless communication system and become synchronized with the central node.

Additionally or alternatively, the second remote node transmits the second uplink message using the second frequency hopping scheme in order to re-synchronize with the central node after having lost synchronization or in order to deliver an operational message to the central node after having lost synchronization. The second remote node may transmit the second uplink message using the second frequency hopping scheme in order to re-synchronize with the central node after having lost synchronization in addition to delivering the operational message.

Optionally, the second frequency hopping scheme is used by remote nodes in the wireless communication system that include a one-way radio transmitter for delivering operational messages.

Typically, receiving and processing both the first and the second uplink messages includes implementing both the synchronized and the non-synchronized frequency hopping schemes together in a receiver of the central node. In some embodiments, implementing both the schemes includes defining a time-slot that includes a system frequency window (SFW) for receiving the first uplink message and a scanning window (SCW) for receiving the second uplink message. Receiving the first uplink message may include tuning the receiver of the central node during the SFW to a current frequency value of a system frequency-hopping function, and upon receiving a valid preamble, remaining tuned to the current frequency value until the entire first uplink message has been received. Additionally or alternatively, receiving the second uplink message includes performing a fast frequency scan during the SCW, and upon detecting a valid preamble at a given frequency, remaining tuned to the given frequency until the entire second uplink message has been received.

In some embodiments the method may also include defining an antenna switching function of the central node, the function specifying respective time slots in which each of a plurality of antennas of the central node is to receive signals, wherein transmitting the first uplink message includes selecting, at the first remote node, an antenna of the central node as a favored antenna for receiving transmissions from the first remote node at the central node, and transmitting the first uplink message in a time-slot selected responsively to the antenna switching function so that the message will be received by the favored antenna at the central node.

Additionally or alternatively, the method may include selecting, for each first antenna of the central node, a respective favored second antenna among two or more second antennas of the first remote node for transmitting signals that will be received at the central node via the first antenna, and transmitting the first uplink message in a specified time slot via the favored second antenna with respect to the first antenna specified by the antenna switching function for the specified time slot.

In some embodiments, transmitting the first uplink message includes forwarding an uplink message received by the first remote node which is configured to operate as a repeater.

In a disclosed embodiment, receiving and processing the uplink messages includes monitoring events detected by the remote nodes, and the method includes issuing an alarm in response to one or more of the detected events.

There is also provided, in accordance with an embodiment of the present invention, a wireless communication system, including:

a plurality of remote nodes, which are configured to operate in accordance with first and second different frequency hopping schemes; and a central node, which is configured to receive and process both a first uplink message transmitted by a first remote node in the wireless communication system according to the first frequency hopping scheme and a second uplink message transmitted by a second remote node in the wireless communication system according to the second frequency hopping scheme.

There is additionally provided, in accordance with an embodiment of the present invention, apparatus for wireless communication, including:
   a radio transceiver, which is configured to transmit uplink messages to a central node in a wireless communication system; and
   a processor, which is coupled to drive the radio transceiver to transmit a first uplink message to the central node according to a first frequency hopping scheme and to transmit a second uplink message to the central node according to a second frequency hopping scheme, which is different from the first frequency hopping scheme.

There is further provided, in accordance with an embodiment of the present invention, apparatus for wireless communication, including:
   a radio transceiver, which is configured to receive uplink messages transmitted by remote nodes in a wireless communication system in accordance with first and second different frequency hopping schemes; and
   a processor, which is coupled to process both a first uplink message transmitted by a first remote node in the wireless communication system according to the first frequency hopping scheme and a second uplink message transmitted by a second remote node in the wireless communication system according to the second frequency hopping scheme.

There is moreover provided, in accordance with an embodiment of the present invention, a method for communication, including:
   transmitting periodic status messages from a remote node to a central node in a wireless communication system;
   in response to the periodic status messages, transmitting acknowledgment messages from the central node to the remote node, the acknowledgement messages including time-stamps; and
   synchronizing the remote node with the central node using the time-stamps.

In a disclosed embodiment, synchronizing the remote node includes aligning a value of a local clock at the remote node with a system clock maintained by the central node. Additionally or alternatively, synchronizing the remote node includes aligning a frequency of the local clock with an actual frequency of the system clock using the time-stamps. In one embodiment, the periodic status messages are transmitted with a fixed interval between the status messages, and adjusting the frequency includes computing a frequency adjustment using the time-stamps and the fixed interval without performing a division operation.

There is additionally provided, in accordance with an embodiment of the present invention, a wireless communication system, including:
   a remote node, which is configured to transmit periodic status messages; and
   a central node, which is configured to transmit acknowledgment messages to the remote node in response to the periodic status messages, the acknowledgement messages including time-stamps,
   wherein the remote node is configured to synchronize with the central node using the time-stamps.

There is furthermore provided, in accordance with an embodiment of the present invention, a method for communication, including:
   transmitting downlink messages in a time-division-duplexing (TDD) wireless communication system using a first frequency hopping function; and
   transmitting uplink messages in the TDD wireless communication system using a second frequency hopping function, which is synchronized with but different from the first frequency hopping function.

The first and second frequency hopping functions may be mutually orthogonal or mutually pseudo-orthogonal.

Typically, transmitting the downlink messages includes transmitting the downlink messages from a central node in the wireless communication system during predetermined downlink windows, and the method includes receiving the downlink messages at receivers of remote nodes in the wireless communication system, wherein the remote nodes actuate the receivers only during the downlink windows. In a disclosed embodiment, when the central node does not have any outstanding downlink messages for transmission, the uplink messages are received at the central node during the downlink windows. Receiving the downlink messages at the remote nodes may have priority over transmitting the uplink messages.

In one embodiment, transmitting the downlink messages includes transmitting at least some of the downlink messages from the central node to one or more repeaters in the wireless communication system in a manner identical to transmitting the downlink messages from the central node to the remote nodes. Additionally or alternatively, transmitting the downlink messages includes transmitting at least some of the downlink messages from the central node to one or more repeaters in the wireless communication system in a manner identical to transmitting of the uplink messages from the remote nodes to the central node, and the method may include receiving the at least some of the downlink messages from the central node at the repeater in a manner identical to receiving the downlink messages from the central node at a remote node. Alternatively, the method includes receiving the at least some of the downlink messages from the central node at the repeater in a manner identical to receiving the uplink messages from the remote nodes at the repeater.

There is also provided, in accordance with an embodiment of the present invention, a wireless communication system, including:
   a central node, which is configured to transmit downlink messages in a time-division-duplexing (TDD) wireless communication scheme using a first frequency hopping function; and
   one or more remote nodes, which are configured to receive the downlink messages and to transmit uplink messages to the central node using a second frequency hopping function, which is synchronized with but different from the first frequency hopping function.

There is also provided, in accordance with an embodiment of the present invention, a method for communication, including:
   defining an antenna switching function of a first node in a wireless communication system, the function specifying respective time slots in which each of a plurality of antennas of the first node is to receive signals;
   selecting, at a second node in the wireless communication system, an antenna of the first node as a favored antenna for receiving transmissions from the second node; and
   transmitting a message from the second node to the first node in a time slot selected responsively to the antenna switching function so that the message will be received by the favored antenna at the first node.

Typically, selecting the antenna includes evaluating respective scores of the antennas of the first node.

In some embodiments, evaluating the respective scores includes evaluating a history of successful receptions via each of the antennas.

Additionally or alternatively, evaluating the respective scores includes evaluating a quality of a respective propagation channel between the second node and each of the antennas.

In some embodiments, evaluating the quality of the respective propagation channel includes evaluating signal quality parameters measured by the second node when receiving an acknowledgment transmitted via each of the antennas.

Additionally or alternatively, evaluating the quality of the respective propagation channel includes measuring signal quality parameters at the first node when receiving transmissions from the second node, and incorporating a value of the measured signal quality parameters within the ACK reply for use in computing the respective scores at the second node.

Commonly, the signal quality parameters evaluated at the first node and/or the second node include a received signal level.

There is also provided, in accordance with an embodiment of the present invention, a method for communication, including:
defining an antenna switching function of a first node in a wireless communication system, the first node having a plurality of first antennas, the function specifying respective time slots in which each of the first antennas is to receive signals;
selecting, for each first antenna among the plurality of the first antennas, a respective favored second antenna among two or more second antennas of a second node in the wireless communication system for transmitting signals that will be received via the first antenna; and
transmitting a message from the second node to the first node in a specified time slot via the favored second antenna with respect to the first antenna specified by the antenna switching function for the specified time slot.

In some embodiments, transmitting the message includes forwarding an uplink message.

There is also provided, in accordance with an embodiment of the present invention, a wireless communication system, including:
a first node, including a plurality of antennas and having a predefined antenna switching function, which specifies respective time slots in which each of the plurality of the antennas is to receive signals; and
a second node, which is configured to select one of the antennas of the first node as a favored antenna for receiving transmissions from the second node, and to transmit a message to the first node in a time slot selected responsively to the antenna switching function so that the message will be received by the favored antenna at the first node.

There is also provided, in accordance with an embodiment of the present invention, a method for communication, including:
a first node, including a plurality of first antennas and having a predefined antenna switching function, which specifies respective time slots in which each of the first antennas is to receive signals; and
a second node, which includes two or more second antennas, and which is configured to select, for each first antenna among the plurality of the first antennas, a respective favored second antenna among the two or more second antennas for transmitting signals that will be received via the first antenna, and to transmit a message to the first node in a specified time slot via the favored second antenna with respect to the first antenna specified by the antenna switching function for the specified time slot.

In some embodiments, the second node includes a repeater, which is configured to forward the message from a remote node.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

The embodiments that are described herein below relate to wireless communication systems, and more specifically to synchronized, time-slotted, frequency-hopping wireless communication systems. Such systems commonly require methods for initial synchronization, maintenance of synchronization, re-synchronization in cases of synchronization loss, high reliability of message delivery, low latency of message delivery, message delivery during periods of synchronization loss, antenna diversity, low current consumption of battery-powered nodes, low cost and simple implementation. An example of a synchronized, time-slotted, frequency-hopping wireless communication system in which these embodiments could be applied is a wireless event reporting system, which serves in the description that follows as a platform for describing the features of these embodiments and the manner in which they meet the above requirements. This event reporting system is described solely by way of example, and the principles of the present invention may similarly be applied in wireless communication systems of other types.

Figure 1:
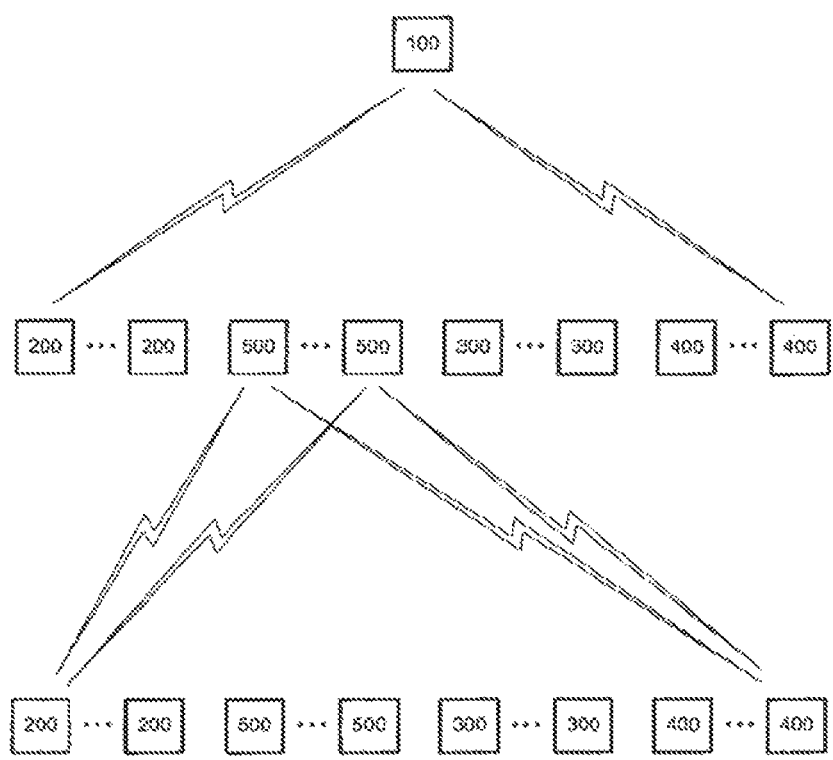
FIG. 1 presents a block diagram of a wireless event monitoring system, in accordance with an embodiment of the present invention.

FIG. 1 presents a block diagram of a wireless event reporting system, for example a wireless alarm system, in accordance with an embodiment of the present invention. The system comprises a central unit 100 and one or more distributed monitoring devices 200. The system might also comprise one or more signaling devices 300, one or more human interface devices 400 and one or more repeaters 500. Throughout the present document, the components of the system are also referred to as nodes, the central unit and the repeaters are referred to as central nodes and all other nodes are referred to as remote nodes.

The monitoring devices detect events of interest and report them to the central unit. The monitoring devices might, for example, be any of the various detectors of an alarm system, such as motion detectors, glass break detectors, magnetic contact detectors, smoke/fire detects, gas detectors, flood detects, panic buttons, human health monitors and similar devices.

The signaling devices produce signals according to commands received from the central unit. For example, a signaling device might be an audio signaling device such as a siren or a visual signaling device such as a warning light. The signaling device might also be a communication device for sending messages from the event monitoring system to other systems, for example a device that sends messages to a remote location over the telephone line.

The human interface devices provide the system user with a remote interface to the central unit. For example, a human interface device might be a remote keypad.

Communication between the nodes of the wireless event monitoring system is usually based on a TDD (time division duplexing) scheme, meaning that at a given moment the radio transceiver is able either to transmit or to receive. The TDD scheme is selected since it is more economical than the alternative FDD (frequency division duplexing) scheme, but the methods described herein below may alternatively be adapted for use in FDD systems.

Communication between the nodes of the wireless event monitoring system comprises uplink messages, transmitted from the remote nodes to the control unit, directly or via one or more repeaters, and downlink messages, transmitted from the control unit to the remote nodes, directly or via one or more repeaters. Both types of messages are usually relatively short. For example, the length of a typical message transmitted in an alarm system is typically on the order of ten to fifty bytes of data.

Uplink traffic comprises event-reporting messages and might also comprise periodic status messages. An event-reporting message is sent from a monitoring device to report an event detected by the device. Usually, event-reporting messages are infrequent. For example, in an alarm system the average rate of event reporting messages is typically on the order of ten to fifty messages per day. On the other hand, those messages need to be delivered with high reliability and at short latency. For example, typical requirements in the context of an alarm system are probability of missed events less than about $10^{-5}$ and latency on the order of about one or two seconds.

Status messages are sent periodically from a remote node to indicate the status of the sending node. Periodic reception of status messages from a remote node also provides an indication of the quality of the wireless link from the remote node to the control unit or the repeater. For example, the European standard EN 50131-5-3 for wireless alarm systems specifies that in a grade 3 system the status RF link should be monitored at least once per 100 seconds, which calls for periodic status messages at intervals of less than 100 seconds between successive messages.

Downlink traffic comprises messages transmitted from the control unit to the signaling devices and the human interfaces devices, and might also comprise messages transmitted from the control unit to the monitoring devices. Messages to the signaling devices are usually infrequent and need to be delivered with high reliability and short latency. Typical requirements in the context of alarm systems are similar to the requirements for event reporting messages.

Communication between the control unit and a given remote node might be either direct, or via a repeater or a sequence of repeaters, depending on system deployment and on the quality of the wireless links between the remote node and the central unit and the between the remote node and the repeaters.

The central nodes of an event monitoring system are typically mains powered, while the remote nodes are typically battery powered. Battery size and battery life-time are usually important factors in wireless event monitoring systems, and therefore one of the important considerations in devising a communication scheme for a wireless event monitoring system is to minimize the current consumption of the remote nodes.

Since a primary function of the distributed monitoring devices is to send report messages, those devices might in principle be fitted with one-way radio transmitters rather than with two-way radio transceivers. Throughout the present document, devices fitted with one-way radio transmitters are referred to as one-way nodes and devices fitted with two-way radio transceivers are referred to as two-way nodes. Although one-way nodes might be more economical, two-way nodes enable much better performances in various aspects, some of which are described below. An embodiment of the present invention that is described hereinbelow relates to systems in which all the remote nodes are two-way nodes. The principles of the present invention, however, may also be applied in systems in which some of the monitoring devices are one-way nodes.

One of the advantages of fitting the remote nodes of the wireless event monitoring system with a two-way radio transceiver is the ability to utilize an automatic repeat request (ARQ) mechanism for the uplink traffic. According to the ARQ mechanism, when an uplink message transmitted by a given remote node is successfully received by a central node, the central node replies with an acknowledgement (ACK) message. If the remote node does not receive an ACK, the remote node retransmits the message one or more times, until an ACK is received, or until some limit for the number of retransmissions is reached. An alternative mechanism, in case ARQ cannot be utilized, is blind repetition, wherein every message is transmitted several times. The advantages of ARQ over blind repetition are increased reliability and reduced current consumption. Another advantage of ARQ over blind repetition is the lower occupancy of the wireless media, which implies lower probability of collision.

Another advantage of two-way communication is the ability to maintain synchronization. Synchronization means that every node in the wireless network is fitted with a local clock. The local clock of the central unit is referred to as the system clock, and all other nodes keep their local clocks synchronized with the system clock. The mechanism of synchronization is based on time stamps transmitted by the central nodes and received by the other nodes. Although wireless event monitoring system might, in principle, be non-synchronized, synchronization enables much better performances in various aspects, some of which are described below.

One of the advantages of synchronizing a wireless event monitoring system is the ability to employ a time-slotted access scheme for the uplink traffic. According to the time-slotted access scheme, the time axis is divided into time-slots, and the duration of a time-slot is sufficient to accommodate a typical uplink message following by an ACK reply. The advantage of the slotted access scheme is reduced probability of collision, which implies higher reliability, lower latency and lower current consumption.

Figure 2:
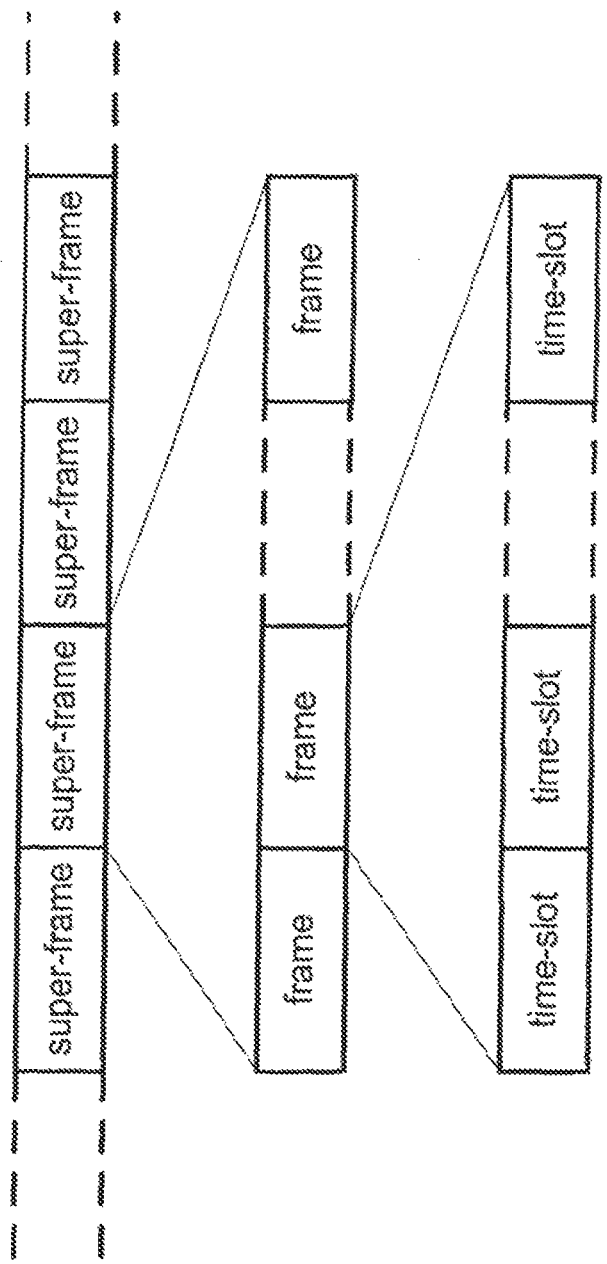
FIG. 2 presents an example of a time-slotted scheme, in accordance with an embodiment of the present invention.

An example of a time-slotted scheme for the uplink of a wireless alarm system is presented in FIG. 2. According to this example, the time access is divided into super-frames of fixed duration, for example 100 seconds, each super frame is divided into frames of fixed duration, for example one second, and each frame is divided into time-slots of fixed duration, for example 40 ms. Each remote node in the system is assigned a respective frame, which restricts the number of remote nodes in this specific example to 100. The first time-slot, or the first few time-slots, in each given frame, are dedicated for transmission of uplink periodic status messages from the remote node associated with the given frame, and the rest of the time-slots within each frame are used for transmission of uplink random access messages, such as event reporting messages. This scheme eliminates potential collision of a given periodic status message with other periodic status messages, because each node transmits the periodic status messages in a different frame. This scheme also eliminates potential collision of a given periodic status message with random access messages, because random access messages are not transmitted in the first time-slot, or time-slots, of the frame that are dedicated for periodic status messages. The probability of collision between random access messages is low, due to the low frequency of those events, and in case such collision does occur, it is recovered by the ARQ mechanism, with random back-off.

Another advantage of synchronizing a wireless event monitoring system is the ability to employ a power save scheme for the downlink. According to the power save scheme, the receiver of the remote node spends most of the time in sleep mode, also referred to as stand-by mode or power-save mode. When in sleep mode, most of the functions of the receiver are disabled, thus keeping the current consumption as low as possible. The local clock of the remote node is retained operative in sleep mode too, in order to maintain synchronization with the system. The local clock is also utilized to wake up the receiver for the downlink windows, as described below.

Figure 3A:
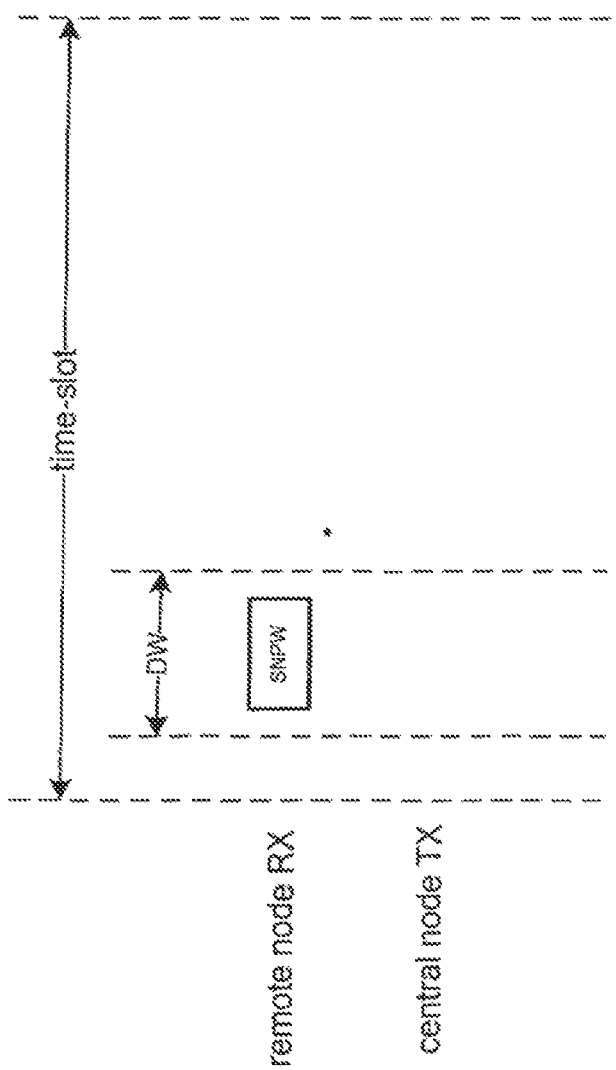
FIGS. 3(a) and 3(b) are timing diagrams that illustrate a power-save scheme, in accordance with an embodiment of the present invention.
Figure 3B:
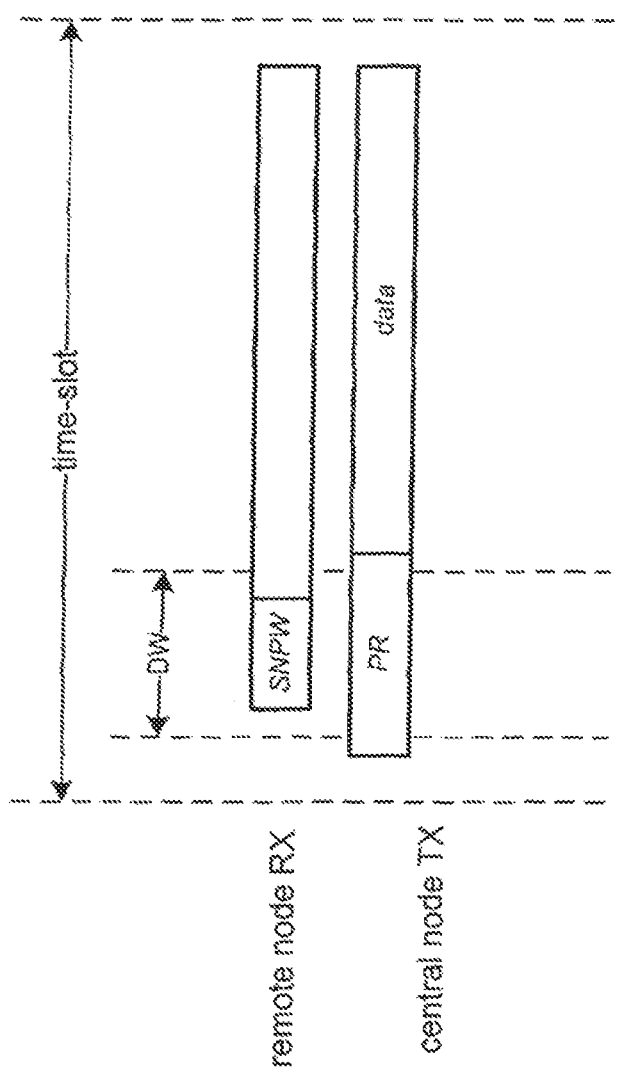

According to the power save scheme, downlink messages are transmitted at determined points in time, referred to as downlink windows. It is advantageous, although not necessary, to align the downlink window structure with the uplink time-slot structure. A power-save scheme, aligned with the uplink time-slot structure, is presented in FIGS. 3(a) and 3(b), wherein FIG. 3(a) illustrates the case of no downlink transmission and FIG. 3(b) illustrates the case of a downlink transmission. The downlink window, denoted in the Figures as DW, is located at the beginning of the time-slot.

According to the power save scheme, the receiver of the remote node is woken up at the beginning of the downlink window and is kept open for a short time-period, referred to as the snapshot window, trying to detect a valid preamble transmitted by a central node. The snapshot window is denoted in the Figures as SNPW. If a valid preamble is detected during the snapshot window, the receiver remains open, detects the rest of the message and then returns to sleep mode, as illustrated in FIG. 3(b). The preamble is denoted in the Figure as PR. Otherwise, the receiver returns to sleep mode after the snapshot window, as illustrated in FIG. 3(a).

The interval between downlink windows might depend on the node type. For example, a typical arrangement for a wireless alarm system would be to schedule downlink windows for the signaling devices on the order of once per second, while scheduling downlink windows for monitoring devices on the order of once per minute.

An advantage of the power-save mode for a wireless event monitoring system is the great reduction in current consumption. A limitation of the power save mode is that a downlink message can be repeated, either according to an ARQ scheme, or according to a blind repetition scheme, only at the next downlink window. Therefore, when power-save mode is employed, it is desirable to protect the downlink messages, as much as possible, from being interfered with by other messages. A method for providing such protection is described further hereinbelow.

Figure 4:
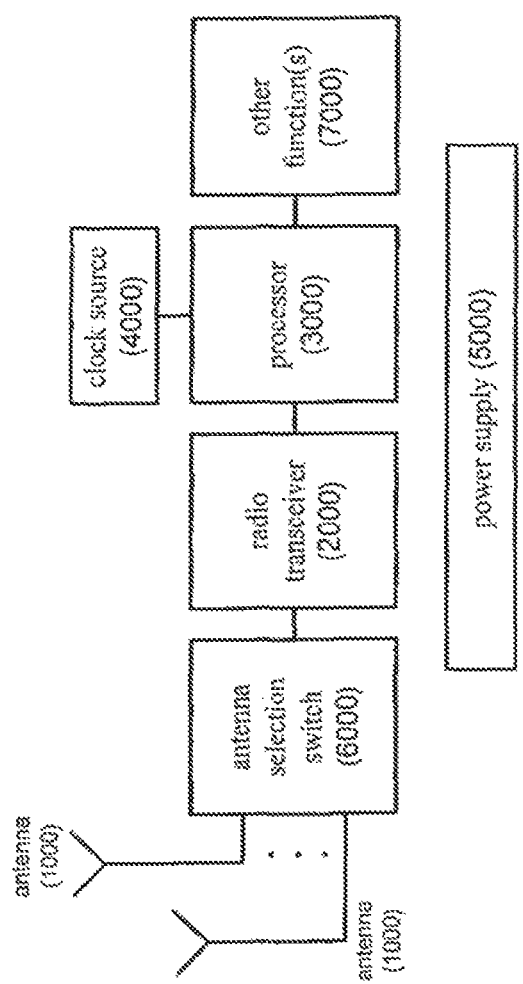
FIG. 4 presents a block diagram of a node in a wireless communication system, in accordance with an embodiment of the present invention.

A block diagram of a node in a wireless communication system, for example a wireless event monitoring system, is presented in FIG. 4. The node comprises one or more antennas 1000, a radio transceiver 2000, a processor 3000, a clock source 4000 and a power supply 5000. In case the node comprises more than one antenna, the node usually comprises also an antenna selecting switch 6000. The node might comprise other functions 7000 too, depending on the type of the node. For example monitoring devices 200 comprise sensing functions, signaling devices 300 comprise signaling functions, and human interfacing devices 400 comprise human interfacing functions.

In wireless alarm systems the central nodes are typically fitted with two antennas and employ receive antenna diversity on the uplink and transmit antenna diversity on the downlink. The monitoring devices, which are typically much lower-cost devices, may be fitted with one antenna only.

The simplified functional blocks shown in FIG. 4 do not necessarily reflect the actual components that are used in constructing the node. For example, the implementation of the radio transceiver might require auxiliary components such as a low noise amplifier (LNA), power amplifier, frequency source and SAW filter. The processing function, as another example, can be implemented by a single processor or by several processors, for example, one processor to handle the communication related tasks and another processor(s) to handle other function(s). Alternatively, the radio transceiver and the processing function may be integrated into one component, such as a Texas Instruments CC1110 System-on-Chip (SoC) device. The clock source, for example, can be implemented as an internal function of the processor or as a separate component that is external to the processor.

Wireless event monitoring systems commonly operate over unlicensed frequency bands. Some examples of unlicensed bands are the 433.29 to 434.79 MHz band, the 868 to 870 MHz band, the 902 to 928 MHz band, the 2.4 to 2.5 GHz band and the 5.725 to 5.875 GHz band. For wireless communication systems that operate in unlicensed frequency bands, it is advantageous to utilize a spread-spectrum scheme, such as frequency-hopping or direct sequence, in order to reduce the probability of co-channel interference with other systems operating in the same band. In some regulatory domains, spread-spectrum is mandatory for this very reason. An embodiment of the present invention addresses systems employing frequency-hopping schemes, and more specifically, systems employing slow frequency-hopping scheme. The term "slow frequency hopping" means that the frequency-hopping rate is substantially lower than the communication symbol rate. In the description below, the term "frequency hopping" always refers to slow frequency hopping.

For a synchronized wireless communication system that employs frequency hopping, it is advantageous to utilize a synchronized frequency-hopping scheme. Synchronized frequency-hopping means that the radio channel used for communication at a given moment in time is a deterministic function of the system clock, and thus it is known to all synchronized nodes in the system. This function is referred to in the present document as the system frequency-hopping function. The range of the system frequency-hopping function might be the entire set of radio channels available for the system, or a subset of that set. The advantage of a synchronized frequency-hopping scheme is that the receiver knows in advance on which radio channel a potential message might be expected, and tunes to this radio channel.

An alternative to a synchronized frequency hopping is non-synchronized frequency hopping, wherein the frequency-hopping function used by a potential transmitter is not known to the receiver, for example since they do not share the same clock. An inherent difficulty with non-synchronized frequency hopping is that the receiver has no prior knowledge of the radio channel used by the transmitter. One method to solve this difficulty is by receiver fast frequency scan. According to this method, the transmitted message begins with a long preamble, and the receiver continuously scans all the potential radio channels. At each radio channel, the receiver stays for a time-period sufficient to detect the existence of a valid preamble. If a valid preamble is detected on a given radio channel, the receiver stays at that channel and detects the rest of the message. Otherwise the receive switches to the next radio channel.

One disadvantage of non-synchronized frequency hopping, compared to synchronized frequency hopping, is that the transmitted messages are necessarily longer, due to the long preamble, and the current consumption of the transmitting nodes is therefore higher. Another disadvantage is that the longer messages imply higher occupancy of the wireless media and higher collision probability.

For a synchronized communication system employing frequency-hopping and time-slotted access, it is advantageous to synchronize the frequency hopping with the slotted access, meaning that the frequency-hopping function is changed at the beginning of a time-slot. This sort of synchronization is use in an embodiment of the present invention.

In order to join a synchronized frequency-hopping wireless communication system, the joining node (such as a remote node in the system of FIG. 1 that has not yet synchronized with a central node) needs to become synchronized with the system. This process is referred to as initial synchronization. In order to become synchronized, the joining node needs to adjust its local clock to system clock, and to obtain the information required for calculating the system frequency-hopping function. One method for initial synchronization with a synchronized frequency-hopping wireless communication system is active synchronization with receiver fast frequency scan.

Figure 5:
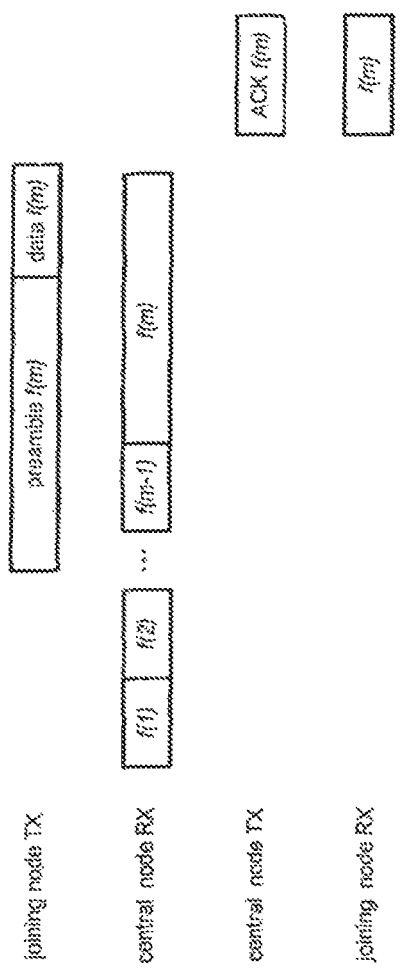
FIG. 5 is a timing diagram that illustrate active synchronization with receiver fast frequency scan, in accordance with an embodiment of the present invention.

The method of active synchronization with receiver fast frequency scan is illustrated in FIG. 5. According to this method, the joining node selects a radio frequency (denoted in the figure by f(m) and a moment in time for transmitting a probe message. The radio channel f(m) is selected from a predetermined set of radio channels, which might be the entire set of radio channels available for the system, or a subset of that set. The selection of the radio channel and the transmission moment are performed locally, since the joining node is not yet synchronized with the system. The probe message comprises a long preamble, which is used by the receiver for fast frequency scan. The central nodes continuously scan all the radio channels (denoted by f(1), f(2), . . . in the figure) within the set of channels allocated for non-synchronized transmissions, staying in each radio channel for the minimum duration required to detect the existence of a valid preamble. If a valid preamble is detected on some given radio channel, the receiver stays on the given radio channel and detects the entire message. If the message is successfully detected, the central node transmits a response message on radio channel f(m), or on another radio channel known to both sides. The response message comprises a time-stamp and other information needed for synchronization, for example the parameters of the frequency-hopping function. Note that the response message might be a standard ACK message, provided that the standard ACK message comprises all the information needed for initial synchronization. The response message might also be a special ACK message with additional information, or a special probe response message.

A potential alternative to active synchronization is passive synchronization, wherein the central node periodically transmits beacon messages, and the joining node employs fast frequency scan until a beacon message is detected.

Active synchronization with fast frequency scan is an advantageous method for wireless event monitoring systems, compared to passive synchronization, some of the advantages being a shorter joining process and reduced current consumption. On the other hand, the scheme of active synchronization with fast frequency scan apparently conflicts with the scheme of time-slotted synchronized frequency hopping, which is an advantageous scheme for the steady-state operation of the event monitoring system. The conflict is caused by the fact that the latter scheme dictates that the receiver reside on one given radio channel during each time-slot, while the former scheme dictates that the receiver scan continuously over all radio channels. In order to resolve this conflict, in an embodiment of the present invention, the scheme of time-slotted, synchronized frequency-hopping is utilized by the synchronized remote nodes, the scheme of active synchronization with receiver fast frequency scan is utilized by the non-synchronized remote nodes, such as joining nodes, and the central node receiver employs both schemes concurrently.

Figure 6A:
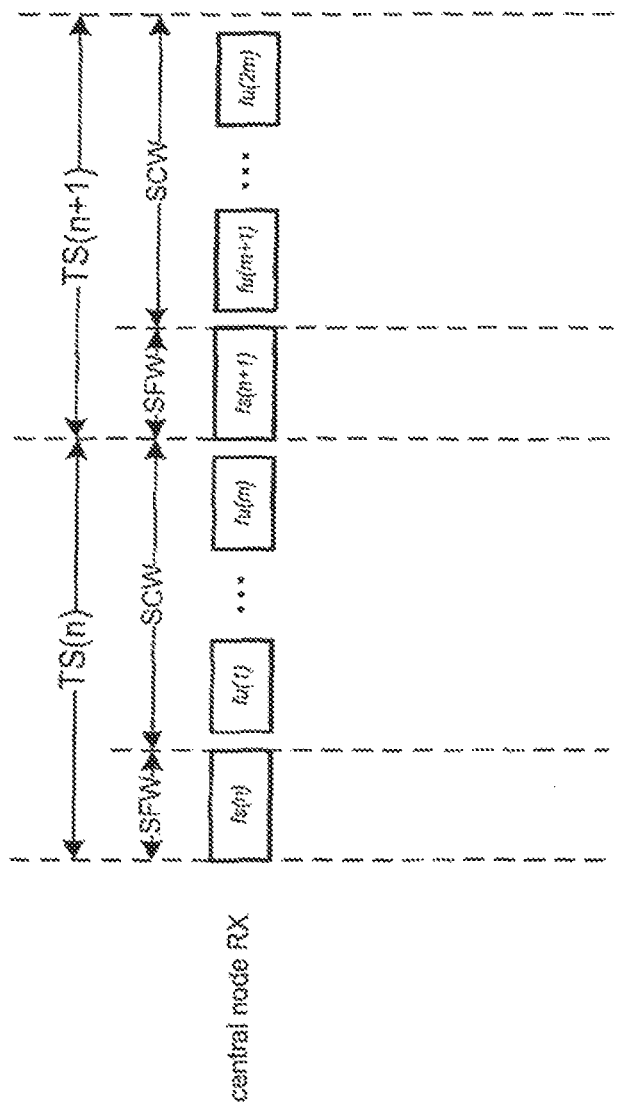
FIGS. 6(a), 6(b) and 6(c) are timing diagrams that illustrates concurrently employment of access schemes, in accordance with an embodiment of the present invention.
Figure 6B:
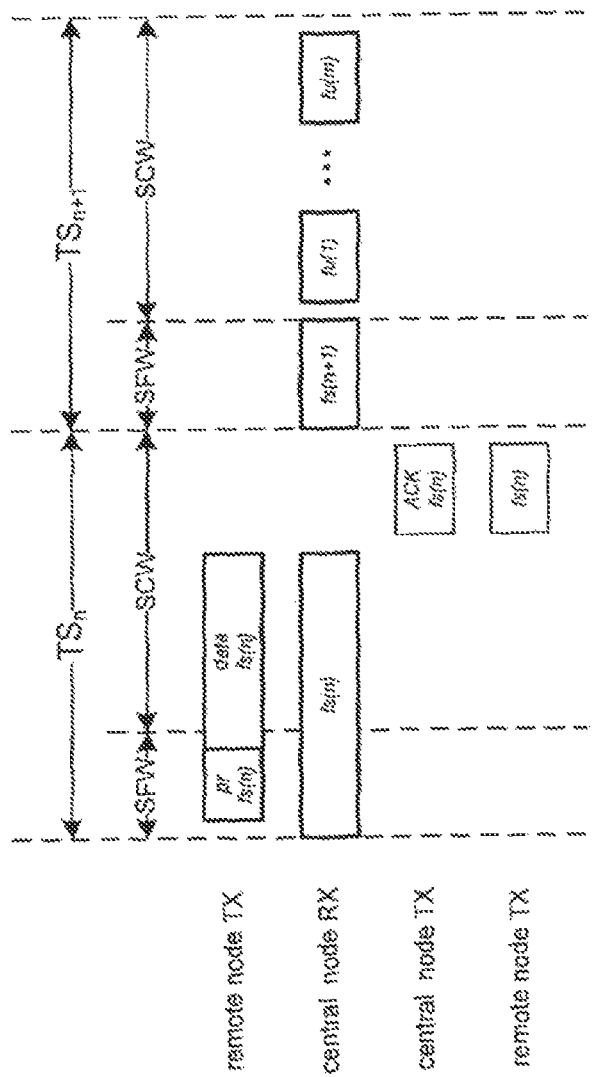
Figure 6C:
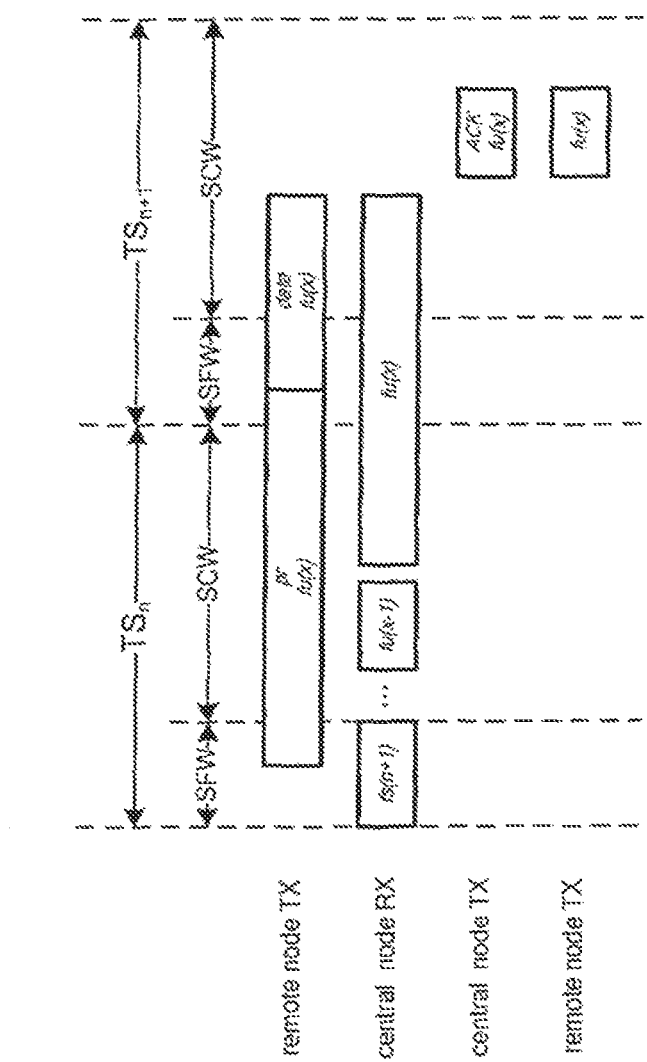

The method of concurrent employment of the two schemes is illustrated in FIGS. 6(a) through 6(c), wherein FIG. 6(a) illustrates the case of no remote node transmission, FIG. 6(b) illustrates the case of transmission by a synchronized remote node, and FIG. 6(c) illustrates the case of transmission by a non-synchronized remote node. Each time-slot (TS) comprises a system frequency window (SFW) and a scanning window (SCW). When transmitting an uplink messages, a synchronized remote node always starts transmitting at the beginning of the SFW. More specifically, the remote node starts the transmission a short time after the beginning of the SFW, in order to compensate for potential misalignment between the local clock of the remote node and the system clock. The uplink message transmitted by the remote node comprises a short preamble, denoted in the figure as pr, followed by the content of the message, denoted in the figure as data. The uplink message is transmitted at the current value of the system frequency-hopping function, denoted in the figure by fs(n)), to indicate that the frequency is a function of the time-slot number n. The SFW is long enough to accommodate a minimal detectable preamble, plus the tolerance dictated by the potential misalignment of the clock at the remote node.

During the SFW, the receiver of the central node stays at fs(n) and attempts to detect a valid preamble. If a valid preamble is detected during the SFW, the receiver of the central node stays at fs(n) and detects the rest of the message. If the message is detected successfully, and the message requires acknowledgment or some other immediate reply, the central node replies at fs(n), or at another frequency known to both sides. If a valid preamble is not detected during the SFW, the receiver of the central node starts a fast frequency scan over the radio channels assigned for non-synchronized transmissions, denoted in the figure as fu(i)). If a valid preamble is detected at some radio channel, denoted by fu(x), during the SCW, the receiver stays at fu(x) and attempts to detect the entire message. If the message is successfully detected, and the message requires acknowledgment or other reply, the central node transmits the reply at fu(x), or at some other radio frequency known to both sides. If a valid preamble is not detected during the SCW, the receiver stops the fast frequency hopping during the SFW of the next time-slot, and continues the fast frequency scan at the SCW of the next time-slot.

One of the advantages of the method of concurrent employment of the two schemes lies in the fact that the receiver employs the fast frequency-scanning scheme during the idle periods of the time-slotted scheme. Thus, the employment of one scheme does affect the efficiency of the other scheme.

When joining a synchronized wireless communication system, the joining node compares the current value of the system clock, as expressed in the time stamp incorporated in the reply message received from the central node, with the current value of it local clock, and aligns its local clock with the system clock. Assuming hypothetically that the system clock and the local clock have exactly the same frequency, the local clock will theoretically remain identical to the system clock for an unlimited period of time. In practice, however, there is usually a slight difference between the frequencies of the local clocks, which causes the difference between their values to increase gradually. Therefore, for a synchronized node to maintain synchronization, the node needs to receive messages comprising time-stamps and to align its local clock according to those time-stamps, wherein the maximum time interval between received time-stamps is inversely proportional to the maximum frequency difference between the local clocks and to the maximum allowable synchronization error. Consider for example the case in which the accuracy of the local clocks is 50 parts per million (ppm) and the maximum acceptable synchronization error is 1 ms. In this case the maximum difference between the frequencies of the system clock and the local clock might reach 100 ppm and therefore the maximum interval between received time-stamps needs to be below 10 seconds.

In order to increase the synchronization accuracy, or increase the allowable gap between time-stamped messages, the frequency of the local clock of the remote node may be adjusted relative to that of the system clock, using a method such as the following: Let the value of the local clock of the remote node when receiving a first time-stamp be t(1), and let the value of the first time-stamp be x(1). When receiving the first time-stamp, the remote node sets its local clock to the value x(1)+d, wherein d is the estimated delay between the creation of the time stamp and the reception of the time-stamped message. The remote node also saves the value x(1) for future reference. Now let the value of the local clock of the remote node when receiving a second time-stamp be t(2), and let the value of the second time-stamp be x(2). When receiving the second time-stamp, the remote node sets its local clock to the value x(2)+d and saves the value x(2) for future reference. The remote node also calculates the value f=(t(2)−x(2))/(x(1)−x(2)), which is an estimation of the frequency different between the local clock and the system clock. The remote node then adjusts the frequency of its local clock by a·f, wherein a is some positive factor, lower than or equal to unity.

The difference in frequency between local clocks is due to long-term reasons, such as the inherent variation between the devices and effect of aging, and to short-term reasons such as temperature variations. Due to the short-term reasons, frequency adjustment should also be performed regularly, for example at each reception of a time-stamped message.

As seen above, the process of calculating the frequency difference f involves division, an operation that might be rather complex for the ultra-low-power and ultra-low-cost processor of the remote node. In an embodiment described hereinbelow, the division may might be avoided by using the periodic nature of the status messages.

As explained above, in order to maintain synchronization a remote node typically needs to receive regularly time-stamped messages. A common method for ensuring regular reception of time-stamped messages is to have the central nodes periodically transmit beacon messages that are time-stamped, and to have the remote nodes receive those beacon messages. One disadvantage of this method is that when a remote node fails to receive a beacon message, it must wait for the next beacon message, which increases the risk of losing synchronization. Another disadvantage of this method for a wireless event monitoring system is the extra current consumption of the remote node, due to the need to wake up to receive the beacon messages.

A method of synchronization of a wireless mesh network without using dedicated beacon messages is described in a white paper entitled: "*Technical Overview of Time Synchronized Mesh Protocol (TSMP)*" by Dust Networks, 30695 Huntwood Avenue, Hayward, Calif. 94544, USA (document number: 025-0003-01, last revised: Jun. 20, 2006). This method may be used in conjunction with the embodiments of the present invention that are described hereinabove.

In an embodiment of the present invention, a wireless event monitoring system may be synchronized without using dedicated beacon. This embodiment uses a method which is based on the regular nature of periodic status messages sent by the remote nodes of the event monitoring system. According to this method, the ACK messages transmitted in reply to the periodic status messages comprise time-stamp fields, and synchronization is based on those time-stamp fields. One advantage of this method is that no extra current consumption is required for the reception of those time-stamped messages. Another advantage of this method is that the ARQ mechanism ensures periodic reception of time-stamped messages, because when the ACK reply fails to be received by the remote node, the status message is retransmitted several times, until an ACK is successfully received. As a result, the probability of losing synchronization due to failure to receive a time-stamp message is very low. Another advantage is due to the periodic nature of the periodic status messages. Since the interval between status messages is fixed (for example 100 seconds), the interval between successive time-stamps is also fixed, and therefore the frequency difference f=[t(2)−x(2)]/[x(1)−x(2)] can be approximated by f=[t(2)−x(2)]·k, where k is a constant, thus avoiding the division operation mentioned above. In summary, this method results in high accuracy and good reliability of the synchronization mechanism, along with relaxed requirements on the stability of the local clock.

A remote node of a synchronized wireless event monitoring system might lose its synchronization with the system, for example, due to failure in receiving messages for a period of time long enough to cause the difference between the system clock and the local clock to exceed the maximum tolerance. In such cases, the node needs to re-synchronize to the system, and the process of re-synchronization is similar to that of initial synchronization. According to an embodiment of the present invention, re-synchronization is performed according to the scheme of active synchronization with receiver fast frequency scanning. According to this embodiment, a node that has lost synchronization with the system transmits re-synchronization probe messages according to the scheme of receiver fast frequency scan, as presented in FIG. 5, and those messages are received and replied to by the central node according to the scheme presented in FIG. 6(c).

A remote node of a synchronized wireless event monitoring system that has lost synchronization with the system might fail to re-synchronize with the system for a long time. One reason for such a situation might be a persistent interference source located in the vicinity of a given remote node. If the given remote node is a monitoring device, it would be advantageous for the node to be able to transmit operative messages, such as event reporting messages and periodic status messages, although the node is not synchronized with the system. According to an embodiment of the present invention, the scheme of receiver fast frequency scan is utilized also by nodes that have lost synchronization in order to transmit operational messages, such as periodic status messages and event reporting messages. According to this embodiment, a node that has lost synchronization with the system transmits the operational message according to the scheme of receiver fast frequency scan, as presented in FIG. 5, and the message is received and acknowledged by the central node according to the scheme presented in FIG. 6(c). If the ACK reply for the operational message is received by the non-synchronized node, the node uses the time-stamp field in the ACK message to re-synchronize to the system. Otherwise the non-synchronized node repeats the operational message several times, until an ACK is received or until some re-transmission limit is exceeded. Thus, the operational message serves both for delivery of information from the remote node to the central unit, and for re-synchronization.

As explained above, a wireless event monitoring system in which all remote nodes are two-way nodes performs better than a system in which the monitoring devices are one-way nodes. Yet, in some situations, it might turn out to be advantageous to allow for the incorporation of some one-way nodes along with the two-way nodes. According to an embodiment of the present invention, one-way nodes might be incorporated into the system, wherein the one-way nodes transmit their operational messages according to the scheme of receiver fast frequency scan, as presented in FIG. 5, and the messages are received by the central node according to the scheme presented in FIG. 6(c), wherein the ACK is superfluous.

An embodiment of the present invention addresses the power-save scheme employed for the downlink. According to the power-save scheme, as explained above, downlink messages are transmitted at determined points in time, referred to as downlink windows. An advantage of the power-save mode for a wireless event monitoring system is the great reduction in current consumption. A limitation of the power-save mode is that a downlink message can be repeated only at the next downlink window. Therefore, it is desirable to protect the downlink messages from being interfered with by uplink messages. This feature is especially important for the downlink messages sent to the signaling devices, because those messages require high reliability and short latency.

A straightforward method for protecting the downlink messages from being interfered with by uplink messages is to identify the uplink time-slots that overlap with the downlink windows and to avoid the utilization of those time-slots for transmission of uplink messages. The disadvantage of this straightforward method is that it reduces the number of available time-slots for uplink transmission, thus implying an increase of the collision probability between uplink messages.

An alternative method for protecting the downlink messages from being interfered with by uplink messages is provided by an embodiment of the present invention. According to this method, the radio channel used for transmission of the downlink messages is determined not by the function used for the uplink transmissions, which is referred to as the uplink frequency-hopping function, but rather by a different function referred to as the downlink frequency-hopping function.

It would be desirable, as far as is permitted by regulations, to have the two frequency-hopping functions orthogonal to each other, wherein the term orthogonal means that the two functions never collide, thus achieving full protection of the downlink messages from being interfered with by uplink messages. In cases in which regulations do not permit employing orthogonal frequency hopping functions, for example in FCC regulations, pseudo-orthogonal functions can be utilized. The term pseudo-orthogonal means that each frequency hopping function is a different pseudo-random function. Since the two functions are different, the probability of collision is about 1/n, wherein n is the number of radio channels in the range of the frequency hopping function.

As explained above, the damage caused by failure in receiving a downlink messages is higher than the damage caused by failure in receiving an uplink message, because retransmission of an uplink message can take place at one of the near time-slots, while retransmission of a downlink message can take place only at the next downlink window. Therefore, in order to protect the downlink messages, these messages have priority over the uplink messages. This priority is achieved by implementing the following algorithms at the transmitter side and at the receiver side.

At the transmitter side, the algorithm for transmitting of downlink messages is as follows: At each downlink window, if the central node does not have any outstanding downlink message, the central node receiver carries on with the reception of potential uplink messages, using the uplink frequency hopping function for reception of potential messages from synchronized nodes, and, if applicable, employing fast frequency scan for reception of potential messages from un-synchronized nodes. On the other hand, if the central node does have an outstanding downlink message, the central node transmits the message in the downlink window, using the downlink frequency hopping function. Thus, transmission of a downlink message has priority over reception of a potential uplink message. Yet, since downlink messages are infrequent, this priority is applied infrequently and has only a minor effect on the reception of uplink messages.

At the receiver side, the algorithm for reception of downlink messages is as follows: In each downlink window applicable to a given remote node, the node tunes its receiver to the current value of the downlink frequency hopping function and attempts to receive a potential downlink message. Reception of downlink messages has priority over transmission of uplink messages, meaning that a given remote node never transmits an uplink message during a downlink window applicable for the given node. Yet, a remote node can transmit uplink messages during downlink messages applicable to other remote nodes. In order to appreciate the advantage of this arrangement, consider an example of a wireless alarm system, in which the rate of the downlink windows of the monitoring devices is much lower than that of the signaling devices, for example once per minute for the monitoring devices versus once per second for the signaling devices. In this example, the monitoring devices are not prevented from transmitting uplink messages during the downlink windows of the signaling devices, and the probability that an uplink message transmitted during those downlink windows will be lost due to a concurrent downlink message is low, since downlink messages are typically infrequent.

Downlink messages are transmitted to the remote nodes either directly or via one or more repeaters, which implies that there should be a mechanism for transmitting downlink messages from a central device to a repeater, wherein the term "central device" refers to the central node and to any of the other repeaters. This mechanism can be implemented according to the following two methods:

The first method for transmitting downlink messages from a central device to a repeater is similar to the method for transmitting downlink messages from a central device to a remote node. The algorithm employed by the central node is identical to the algorithm for transmitting downlink messages to remote nodes. (Actually, a message transmitted by the central node might be simultaneously addressed to more than one remote node and/or repeater.) The algorithm employed by the repeater is similar to the algorithm employed by a remote node. At each downlink window, the repeater stops its activity in receiving potential uplink messages, sets its receiver to the current value of the downlink frequency hopping function, and attempts to receive a potential downlink message.

The second method for transmitting downlink messages from a central node to a repeater is similar to the method for transmitting uplink messages from a remote node to a central node. The algorithm employed by the receiving repeater is identical to the algorithm for receiving uplink messages. Actually, the repeater employs the same scheme for receiving both uplink messages from remote nodes and downlink messages from other central nodes. The algorithm employed by the transmitting central node is similar to the algorithm employed by a remote node for transmitting an uplink message. When transmitting a downlink message to a repeater, the central node is necessarily unable to receive uplink messages, but since downlink messages are infrequent, this fact has minor effect on the probability of missing an uplink message.

One advantages of the second method is the better reliability and shorter latency of the hop between the central node and the repeater, because the time gap between retransmissions is much shorter.

Another advantage of the second method is that it avoids the main drawback of the first method, which is the fact that during the downlink windows the repeater has to switch to a different radio channel and is therefore not able to receive potential uplink messages.

In a wireless communication link that is subject to multipath propagation, the propagation channel between the transmitting antenna and the receiving antenna can vary significantly as a result of relatively small displacements of the antenna. Furthermore, the propagation channel between the transmitting antenna and the receiving antenna might also vary significantly as a result of the relative orientation of the two antennas, due to polarization. Therefore, it is a common practice in wireless communication systems to utilize antenna diversity, by fitting the transmitter or the receiver, or both, with more than one antenna (usually two). The antennas are located at some distance from one another, and might also have different orientations (usually perpendicular to one another). A simple and common method for antenna diversity is switched antenna diversity, which can be employed by the transmitter and/or by the receiver. According to this method, when transmitting or receiving via a given antenna results in a significantly better propagation channel than via the other antenna, the better antenna is selected for transmission or reception, respectively.

Figure 7:
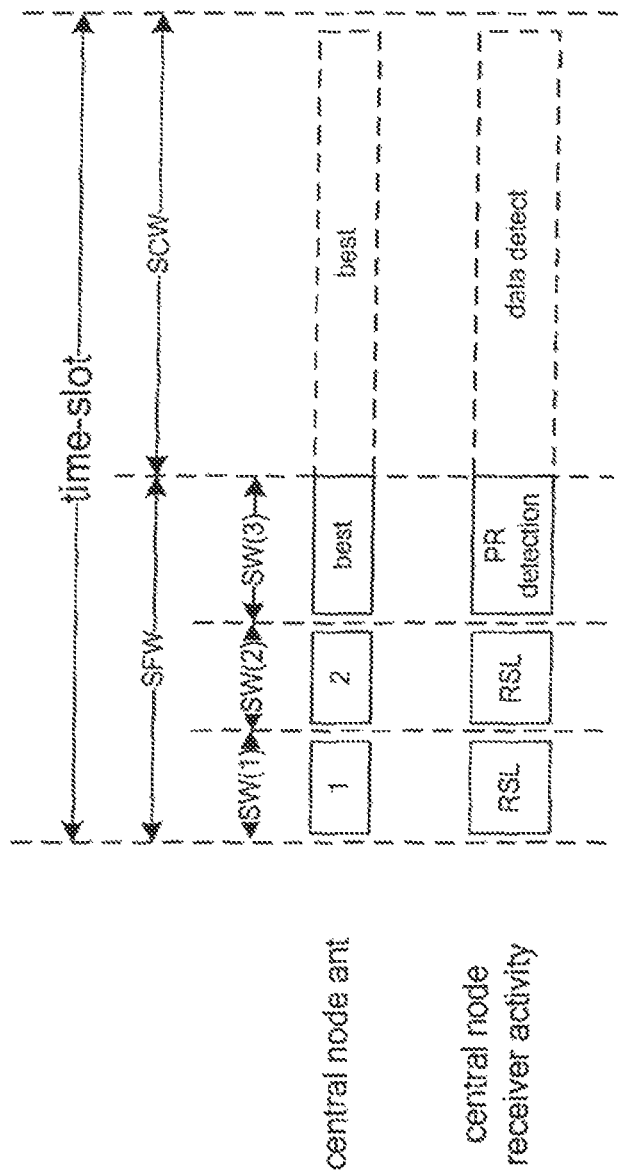
FIG. 7 is a timing diagram that illustrates an intra-message switched antenna diversity scheme, in accordance with an embodiment of the present invention.

FIG. 7 is a timing diagram that schematically illustrates a method of intra-message antenna diversity that may be implemented by a central node of a wireless event monitoring system, in accordance with an embodiment of the present invention. In this example, the central node uses intra-message antenna diversity for the reception of a synchronized uplink messages, using the method illustrated in FIGS. 6(a) and 6(b). According to FIG. 7, the SFW comprises three sub-windows, denoted in the Figure as SW(1), SW(2) and SW(3). During SW(1) the central node receiver is switched to the first antenna and measures some quality parameter of the signal received via the first antenna, such as the received signal level. During SW(2) the central node receiver performs the same operation for the second antenna. During SW(3) the central node receiver is switched to the antenna with the higher quality parameter, and attempts to detect a valid preamble. The subsequent operation of the central node receiver depends on the result of the preamble detection process, as illustrated in FIGS. 6(a) and 6(b).

In a similar manner, the method of intra-message antenna diversity can also be applied for the reception of non-synchronized uplink messages in accordance with FIGS. 6(a) and 6(c), wherein each of the time-periods denoted in the Figures by fu(i) comprises sub-windows SW(1), SW(2) and SW(3) with the same functionality.

The disadvantages of this method of intra-message antenna diversity is the excessive length of the preamble that it requires. In this method the preamble needs to accommodate SW(1) and SW(2) in addition to SW(3), which is required regardless of the antenna diversity function. This disadvantage of the of intra-message antenna diversity method is especially significant for a wireless event monitoring system, since for such systems, the longer preamble means (a) higher current consumption at the remote nodes and (b) longer time-slots, which implies fewer time-slots per frame. An alternative embodiment, described hereinbelow, provides a method of transmitter-selected receiver antenna diversity that requires no excess preamble length.

Figure 8:
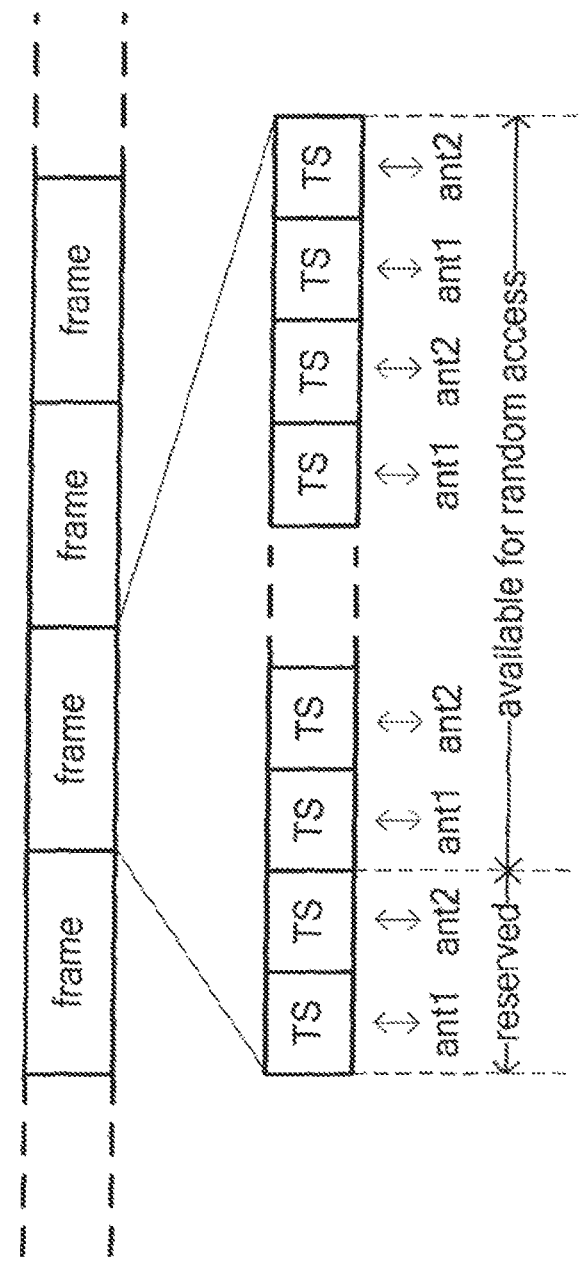
FIG. 8 a timing diagram that presents an example of an antenna switching function, in accordance with an embodiment of the present invention.

FIG. 8 is a timing diagram that schematically illustrates a method of transmitter-selected receiver antenna diversity that operates in accordance with the uplink time-slotted scheme of FIG. 2. According to this embodiment, each time-slot (TS) within a frame is associated with a given antenna, and the antenna associated with a given time-slot is utilized by the receiver of the central node to receive synchronized uplink messages transmitted during the given time-slot. The association between time-slot number and antenna number is a fixed function, referred to as the antenna switching function, that is also known to the remote nodes. In the example presented FIG. 8, the antenna switching function associates the odd time-slots with the first antenna (denoted in the Figure as ANT1) and the even time-slots with the second antenna (ANT2). FIG. 8 also shows that the first two time-slots in each frame are reserved for periodic status messages, while the rest of the time-slots are available for random access.

Since the antenna switching function is known to the remote nodes, each remote node that has an outstanding uplink message is able to select the antenna of the central node that will receive the message by selecting the time-slot in which the message is transmitted accordingly to the antenna switching function. In the case of a periodic status message, the remote node is able to select one of the two time-slots reserved for periodic status messages, and in the case of random access, the remote node is able to select one of the time-slots available for random access. In case of retransmission, the time-slot for retransmission is selected according to the random back-off mechanism and according to the antenna selection mechanism.

In order to select the antenna of the central node for reception of an outstanding message, each remote node calculates the score of each of the antennas of the central node. Any suitable method of calculation may be used. For example the antenna used for the last successful uplink transmission might have a high score and the other antenna (s) a low score. Calculating the score can also involve more elaborate statistics, for example, the number of successful receptions via each antenna during the last x successful receptions or the last y time units. Calculating the score can also depend on link quality parameters associated with each successful transmission. The link quality parameters can be signal quality parameters measured by the remote node when receiving the ACK reply. A simple, useful and commonly-used signal quality parameter is the received signal level, which is inversely proportional to the channel attenuation, assuming a fixed or known transmit signal level.

Alternatively or additionally, the link quality parameters can be signal quality parameters measured by the central node when receiving the uplink message, provided that these parameters are incorporated in the ACK reply. For example, the signal quality parameters can comprise the received signal level, which is commonly incorporated in the ACK reply in order to facilitate transmission power control. It should be noted that in bi-directional communication links employing the TDD scheme, which utilize the same radio frequency for both directions, the propagation channel between the antennas is reciprocal, and therefore similar scoring applies to both directions of the link.

Communication systems usually employ ARQ, as described above. According to this method, when a message is not replied by an ACK, the message is retransmitted according to some random back-off mechanism. When transmitter-selected receiver antenna diversity is employed, the time-slot for retransmission is selected according to the random back-off mechanism and according to the antenna selection mechanism. The design of the antenna selection mechanism for retransmission depends on various parameters. For example, if the temporal variations of the propagation channels are expected to be slow, a suitable policy would be to retransmit several times to the same antenna before switching to the other antenna. The advantage of such a policy is that it minimizes the average number of retransmissions. But on the other hand, such a policy increases the worst-case time for message delivery. Therefore, in cases in which worst-case delivery time must be short, or in cases in which the temporal variations of the propagation channel are quick, a more suitable policy would be to switch to the other antenna at each retransmission.

Uplink antenna diversity has been discussed above in the context of a single-antenna transmitter and a multi-antenna receiver, which is the common case for event monitoring systems since monitoring devices 200 are typically single-antenna nodes. However, cases of uplink antenna diversity between a multi-antenna transmitter and a multi-antenna receiver may also be applicable. For example, signaling device 300 and human interface device 400 of a wireless event monitoring system are typically bigger and more expensive, and may be fitted with more than one antenna. Another example are repeaters 500 of the wireless event monitoring system, which are usually fitted with two antennas.

In case of a multi-antenna uplink transmitter, two methods can be used. The first method is to select one of the two antennas of the uplink transmitter as the transmitting antenna, and to employ the same method as in the case of a single-antenna uplink transmitter. The second method is to select the transmit antenna according to the receive antenna. According to the second method, the transmitter calculates the score of each of its antennas with respect to each antenna of the receiver. When transmitting a message at a given time, the transmitter selects for transmission the antenna with the best score with respect to the antenna utilized by the receiver at the given time.

An advantage of the method of selecting the transmit antenna according to the receive antenna is that the transmitter is usually able to select the transmission time regardless of the antenna switching function utilized by the receiver, because for each receive antenna there is usually at least one transmit antenna such that the propagation channel between the transmit and receive antennas is not subject to severe degradation due to multipath or polarization. The freedom in selecting the transmission time may, in many cases, be valuable. Consider, for example, a wireless event monitoring system in which the communication between the central unit and the remote nodes is either direct or via at most one repeater, and in which the central unit and the repeaters are dual-antenna units. In this system it is advantageous to reserve in each frame one or more time-slots for forwarding periodic status messages by a potential repeater, thus avoiding any interference between forwarded periodic messages and other uplink messages. For example, the first two time-slots in each frame can be reserved for transmission of periodic status messages, and the next one or two time-slots might be reserved for forwarding those messages by a potential repeater, when applicable. Now, the number of time-slots reserved for potential forwarding of periodic status messages depends on the antenna diversity method employed by the repeater. If the first method is employed, two time-slots need to be reserved, whereas if the second method is used, one time-slot is sufficient.

Antenna diversity is applicable to the downlink messages, too. For single-antenna remote nodes, the central node should transmit the message multiple times, once via each antenna, and each transmission should take place in different downlink window. The mapping between the transmit antenna and the downlink window is a deterministic function, which is also known to the remote nodes. The wake-up policy employed by the remote nodes might be (a) to wake up in the downlink windows corresponding to each transmit antenna or (b) to wake up only in the downlink window of the best transmit antenna. The first policy can be employed when the temporal variations of the propagation channels are expected to be slow, the potential increase in latency can be tolerated, and the current consumption requirements are strict. The second policy can be employed when the temporal variations of the propagation channels are expected to be quicker, the potential increase in latency cannot be tolerated, and the current consumption requirements are more relaxed.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication in a wireless communication system comprising at least a first node and a second node, the method comprising:
    defining an antenna switching function of the first node, the antenna switching function specifying, for each antenna of a plurality of antennas of the first node, a corresponding time slot in which the antenna will receive transmissions;
    selecting, by the second node, a favored antenna from among the plurality of antennas of the first node, the favored antenna being favored by the second node for receiving, by the first node, transmissions transmitted from the second node to the first node;
    responsive to the selecting, by the second node, of the favored antenna from among the plurality of antennas of the first node, selecting, by the second node, a favored time slot, the favored time slot corresponding to the selected favored antenna, in accordance with the antenna switching function of the first node;
    and responsive to the selecting, by the second node, of the favored time slot, transmitting a message from the second node to the first node during the favored time slot, thereby causing receipt of the message by the favored antenna at the first node,
    wherein selecting the favored antenna comprises evaluating respective scores of the antennas of the first node, and evaluating the respective scores comprises evaluating a quality of a respective propagation channel between the second node and each of the antennas, and evaluating the quality of the respective propagation channel comprises evaluating signal quality parameters measured by the second node when receiving an acknowledgment transmitted via each of the antennas.

2. The method according to claim 1, wherein evaluating the respective scores comprises evaluating a history of successful receptions via each of the antennas.

3. The method according to claim 1, wherein the signal quality parameters comprise a received signal level.

4. The method according to claim 1, wherein evaluating the quality of the respective propagation channel comprises measuring signal quality parameters at the first node when receiving transmissions from the second node, and incorporating a value of the measured signal quality parameters within the ACK reply for use in computing the respective scores at the second node.

5. The method according to claim 4, wherein the signal quality parameters comprise a received signal level.

6. A method for communication in a wireless communication system comprising at least a first node and a second node, the method comprising:
    defining an antenna switching function of the first node, the antenna switching function specifying, for each first antenna of a plurality the first antennas of the first node, a corresponding time slot in which the first antenna will receive transmissions;
    selecting, by the second node, for each first antenna of the plurality of the first antennas of the first node, a corresponding favored second antenna from among a plurality of second antennas of the second node for transmitting transmissions that will be received via the first antenna;
    for a given time slot, ascertaining, by the second node, a time slot-specific first antenna of the plurality the first antennas which will receive transmissions during the given time slot in accordance with the antenna switching function of the first node;
    responsive to the ascertaining of the time slot-specific first antenna, ascertaining, by the second node, the corresponding favored second antenna for transmitting transmissions which will be received via the time slot-specific first antenna;
    transmitting, by the second node, during the given time slot, a message to the selected first antenna of the first node via the corresponding favored second antenna of the second nod,
    wherein selecting the favored second antenna comprises evaluating respective scores of the second antennas of the second node, and evaluating the respective scores comprises evaluating a quality of a respective propagation channel between the first node and each of the second antennas, and evaluating the quality of the respective propagation channel comprises evaluating signal quality parameters measured by the first node when receiving an acknowledgment transmitted via each of the second antennas.

7. The method according to claim 6, wherein transmitting the message comprises forwarding an uplink message.

8. A wireless communication system for communicating in a wireless communication system, the system comprising:
    a first node, comprising a plurality of antennas and having a predefined antenna switching function associated therewith, which antenna switching function specifies, for each of the plurality of the antennas, a corresponding time slot in which the antenna will receive transmissions;
    and a second node operative:
    to select a favored antenna from among the plurality of antennas of the first node, the favored antenna being favored by the second node for receiving, by the first node, transmissions transmitted from the second node to the first node;
    responsive to the selecting, by the second node, of the favored antenna from among the plurality of antennas of the first node, to select a favored time slot, the favored time slot corresponding to the selected favored antenna, in accordance with the antenna switching function of the first node;
    and responsive to the selecting, by the second node, of the favored time slot, to transmit a message to the first node during the favored time slot, thereby causing receipt of the message by the favored antenna at the first node, wherein the second node is further operative to select the favored antenna by evaluating respective scores of the antennas of the first node, in which evaluating the respective scores comprises evaluating a quality of a respective propagation channel between the second node and each of the antennas, and in which evaluating the quality of the respective propagation channel comprises evaluating signal quality parameters measured by the second node when receiving an acknowledgment transmitted via each of the antennas.

9. The system according to claim 8, wherein evaluating the respective scores comprises evaluating a history of successful receptions via each of the antennas.

10. The system according to claim 8, wherein the signal quality parameters comprise a received signal level.

11. The system according to claim 8, wherein evaluating the quality of the respective propagation channel comprises measuring signal quality parameters at the first node when receiving transmissions from the second node, and incorporating a value of the measured signal quality parameters within the ACK reply for use in computing the respective scores at the second node.

12. The system according to claim 11, wherein the signal quality parameters comprise a received signal level.

13. A wireless communication system for communicating in a wireless communication system, the system comprising:
a first node, comprising a plurality of first antennas and having a predefined antenna switching function associated therewith, which antenna switching function specifies, for each first antenna of the plurality of first antennas, a corresponding time slot in which the first antenna will receive transmissions;
and a second node comprising a plurality of second antennas, and operative to:
select, for each first antenna of the plurality of the first antennas of the first node, a corresponding favored second antenna from among the plurality of second antennas for transmitting transmissions that will be received via the first antenna;
for a given time slot, to ascertain a time slot-specific first antenna of the plurality the first antennas which will receive transmissions during the given time slot in accordance with the antenna switching function of the first node;
responsive to the ascertaining of the time slot-specific first antenna, to ascertain the corresponding favored second antenna for transmitting transmissions which will be received via the selected first antenna;
and to transmit, by the second node, during the given time slot, a message to the time slot-specific first antenna of the first node via the corresponding favored second antenna of the second nod,
wherein the favored second antenna is selected by evaluating respective scores of the second antennas of the second node, in which evaluating the respective scores comprises evaluating a quality of a respective propagation channel between the first node and each of the second antennas, and in which evaluating the quality of the respective propagation channel comprises evaluating signal quality parameters measured by the first node when receiving an acknowledgment transmitted via each of the second antennas.

14. The system according to claim 13, wherein the second node comprises a repeater, which is configured to forward the message from a remote node.

* * * * *